(12) United States Patent
Hara (10) Patent No.: US 11,741,727 B2
(45) Date of Patent: Aug. 29, 2023

(54) DRIVER MONITORING SYSTEM FOR JUDGING DISTRACTED DRIVING

(71) Applicant: TOYOTA JIDOSHA KABUSHIKI KAISHA, Toyota (JP)

(72) Inventor: Kenichiroh Hara, Yokohama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 13 days.

(21) Appl. No.: 17/347,839

(22) Filed: Jun. 15, 2021

(65) Prior Publication Data

US 2021/0390322 A1    Dec. 16, 2021

(30) Foreign Application Priority Data

Jun. 16, 2020  (JP) ................ 2020-103729

(51) Int. Cl.
   *G06V 20/59*    (2022.01)
   *G06V 40/16*    (2022.01)

(52) U.S. Cl.
   CPC .......... *G06V 20/597* (2022.01); *G06V 40/165* (2022.01)

(58) Field of Classification Search
   CPC ................ G06V 20/597; G06V 40/165; B60R 2300/802; B60R 2300/8026
   See application file for complete search history.

(56) References Cited

U.S. PATENT DOCUMENTS

| | | | | |
|---|---|---|---|---|
| 10,126,422 | B1* | 11/2018 | Obodo | G01S 13/56 |
| 2008/0316054 | A1* | 12/2008 | Lynam | B60R 1/1207 |
| | | | | 340/904 |
| 2015/0232028 | A1* | 8/2015 | Reardon | B60R 1/00 |
| | | | | 348/148 |
| 2016/0001781 | A1* | 1/2016 | Fung | G06V 40/45 |
| | | | | 701/36 |
| 2017/0187963 | A1* | 6/2017 | Lee | G02B 27/01 |
| 2019/0147266 | A1* | 5/2019 | Aizawa | B60K 37/06 |
| | | | | 340/576 |
| 2019/0147272 | A1* | 5/2019 | Yokota | G06V 40/18 |
| | | | | 340/576 |
| 2019/0168771 | A1* | 6/2019 | Migneco | B60W 40/08 |
| 2021/0124962 | A1* | 4/2021 | Kim | B60W 40/08 |
| 2021/0197747 | A1* | 7/2021 | Yoshizawa | G06V 20/597 |
| 2021/0237743 | A1* | 8/2021 | Boström | G06V 20/597 |

(Continued)

FOREIGN PATENT DOCUMENTS

| | | |
|---|---|---|
| CN | 109795499 A | 5/2019 |
| JP | 10-166974 A | 6/1998 |

(Continued)

*Primary Examiner* — Brian T Pendleton
*Assistant Examiner* — Frank Johnson
(74) *Attorney, Agent, or Firm* — Sughrue Mion, PLLC (57) ABSTRACT

A driver monitoring system includes an image capturing device capturing a face of a driver of a vehicle to generate a facial image of the driver, and a processor configured to detect an angle of a facial orientation or a line of sight of the driver based on the facial image, and judge distracted driving by the driver based on the angle. The vehicle is provided with at least one indicator showing a presence of a surrounding vehicle in a rear lateral area of the vehicle. When the indicator is turned on, the processor is configured to ease a condition for judging distracted driving concerning a predetermined angular range when the driver looks at the indicator.

3 Claims, 5 Drawing Sheets

(56) References Cited

U.S. PATENT DOCUMENTS

2021/0253025 A1 8/2021 Akachi et al.
2021/0394775 A1* 12/2021 Julian .................... G08G 1/164

FOREIGN PATENT DOCUMENTS

| JP | 2003-118523 A | 4/2003 |
| JP | 2007-226666 A | 9/2007 |
| JP | 2018-108784 A | 7/2018 |
| JP | 2019-191788 A | 10/2019 |
| JP | 2020-24532 A | 2/2020 |

* cited by examiner

DRIVER MONITORING SYSTEM FOR JUDGING DISTRACTED DRIVING

FIELD

The present disclosure relates to a driver monitoring system.

BACKGROUND

In the past, it has been known to use an image capturing means provided in a vehicle to monitor a state of a driver. In regard to this, in PTL 1, it is described that a warning be output when a time elapsed from when detecting distracted driving has reached a warning standby time and that the warning standby time be made longer when a surrounding vehicle running to the rear or side of a host vehicle is detected.

CITATIONS LIST

Patent Literature

PTL 1: Japanese Unexamined Patent Publication No. 2007-226666

SUMMARY

Technical Problem

However, sometimes a driver looks at somewhere other than the front not only for checking the situation surrounding the vehicle but also for checking an indication of a driver assistance device provided at the vehicle (for example, a blind spot monitor). If at this time it is judged that the driver is driving while distracted and a warning is issued to the driver, it would mean a warning is issued for an appropriate action of the driver and the driver would be irritated.

Therefore, an object of the present disclosure is to provide a driver monitoring system enabling suitable detection of distracted driving by a driver.

Solution to Problem

The summary of the present disclosure is as follows.

(1) A driver monitoring system comprising: an image capturing device capturing a face of a driver of a vehicle to generate a facial image of the driver; and a processor configured to detect an angle of a facial orientation or a line of sight of the driver based on the facial image, and judge distracted driving by the driver based on the angle, wherein the vehicle is provided with at least one indicator showing a presence of a surrounding vehicle in a rear lateral area of the vehicle, and when the indicator is turned on, the processor is configured to ease a condition for judging distracted driving concerning a predetermined angular range when the driver looks at the indicator.

(2) The driver monitoring system described in above (1), wherein the processor is configured to judge that the driver is driving while distracted if the angle is outside a threshold range for equal to or greater than a threshold time, and broaden the threshold range so that the predetermined angular range is included in the threshold range when the indicator is turned on.

(3) The driver monitoring system described in above (1), wherein the processor is configured to judge that the driver is driving while distracted if the angle is maintained within the predetermined angular range for equal to or greater than a first threshold time when the indicator is not turned on, and judge that the driver is driving while distracted if the angle is maintained within the predetermined angular range for equal to or greater than a second threshold time when the indicator is turned on, and the second threshold time is longer than the first threshold time.

Advantageous Effects of Invention

According to the present disclosure, there is provided a driver monitoring system enabling suitable detection of distracted driving by a driver.

DESCRIPTION OF EMBODIMENTS

Below, referring to the drawings, embodiments of the present disclosure will be explained in detail. Note that, in the following explanation, similar component elements are assigned the same reference notations.

<First Embodiment>

Figure 1:
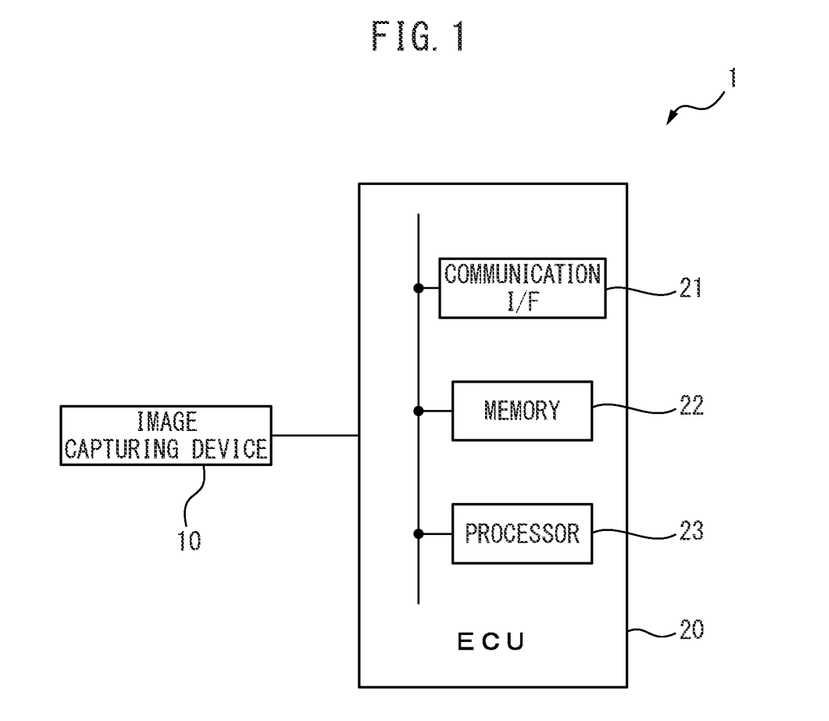
FIG. 1 is a block diagram schematically showing a configuration of a driver monitoring system according to a first embodiment of the present disclosure.

Below, referring to FIG. 1 to FIG. 6, a first embodiment of the present disclosure will be explained. FIG. 1 is a block diagram schematically showing the configuration of a driver monitoring system 1 according to the first embodiment of the present disclosure. The driver monitoring system 1 is mounted in a vehicle and monitors a driver of the vehicle. The driver monitoring system 1 is provided with an image capturing device 10 and an electronic control unit (ECU) 20.

Figure 2:
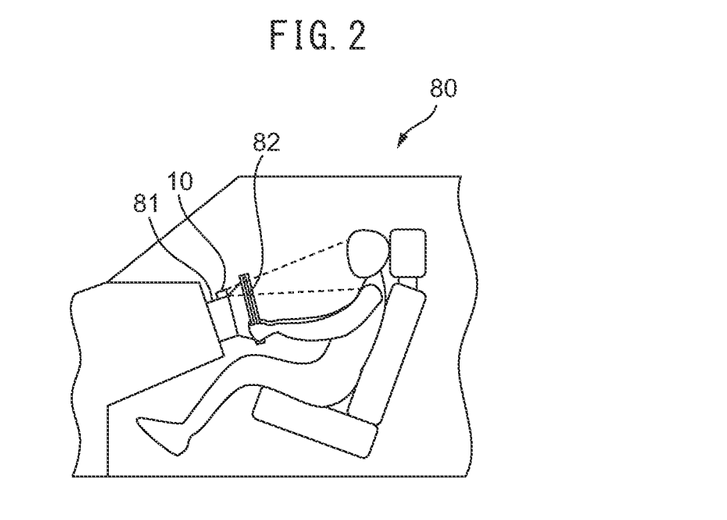
FIG. 2 is a view schematically showing an inside of a vehicle mounting the driver monitoring system.

FIG. 2 is a view schematically showing an inside of a vehicle 80 mounting the driver monitoring system 1. The image capturing device 10 captures a face of the driver of the vehicle 80 and generates a facial image of the driver. The image capturing device 10 is a so-called "driver monitor camera".

The image capturing device 10 is provided at the inside of the vehicle 80. Specifically, as shown in FIG. 2, the image capturing device 10 is provided at the top part of a steering column 81 of the vehicle 80. In FIG. 2, the range of projection of the image capturing device 10 is shown by the broken lines. Note that, the image capturing device 10 may be provided at the steering wheel 82, a room mirror, an instrument panel, an instrument panel hood, etc., of the vehicle 80. Further, the driver monitoring system 1 may be provided with a plurality of image capturing devices 10.

The image capturing device 10 includes a camera and a projector. The camera is configured by a lens and an image capturing element and is for example a CMOS (complementary metal oxide semiconductor) camera or a CCD (charge coupled device) camera. The projector is comprised of LEDs (light emitting diodes). For example, it is comprised of two near infrared LEDs placed at the both sides of the camera. By irradiating the driver with near infrared light, it is possible to capture the face of the driver without irritating the driver even at night time or otherwise when the luminance is low. Further, a band pass filter removing light of wavelength components other than near infrared light is provided inside the camera, while a visible light cut filter removing light of the red wavelength component emitted from the near infrared LEDs is provided in front of the projector.

As shown in FIG. 1, the ECU 20 includes a communication interface 21, a memory 22, and a processor 23, and executes various control routines of the vehicle 80. Note that, in the present embodiment, a single ECU 20 is provided, but a plurality of ECUs may be provided corresponding to the different functions.

The communication interface 21 has an interface circuit for connecting the ECU 20 to an internal vehicle network based on the CAN (Controller Area Network) or other standard. The ECU 20 communicates with vehicle-mounted devices such as the image capturing device 10 through the communication interface 21 and the internal vehicle network.

The memory 22, for example, has a volatile semiconductor memory (for example, RAM) and a nonvolatile semiconductor memory (for example, ROM). The memory 22 stores programs to be run by the processor 23, various types of data to be used when various types of processing are performed by the processor 23, etc. The memory 22 is one example of a storage device.

The communication interface 21 and the memory 22 are connected to the processor 23 through signal lines. The processor 23 has one or more CPUs (central processing units) and their peripheral circuits and performs various types of processing. Note that the processor 23 may further have other processing circuits such as arithmetic logic units or numerical calculation units.

For example, when an ignition switch of the vehicle 80 is turned on, the image capturing device 10 repeatedly captures the face of the driver at predetermined intervals to generate a facial image of the driver. The facial image of the driver generated by the image capturing device 10 is sent through the internal vehicle network from the image capturing device 10 to the ECU 20.

Figure 3:
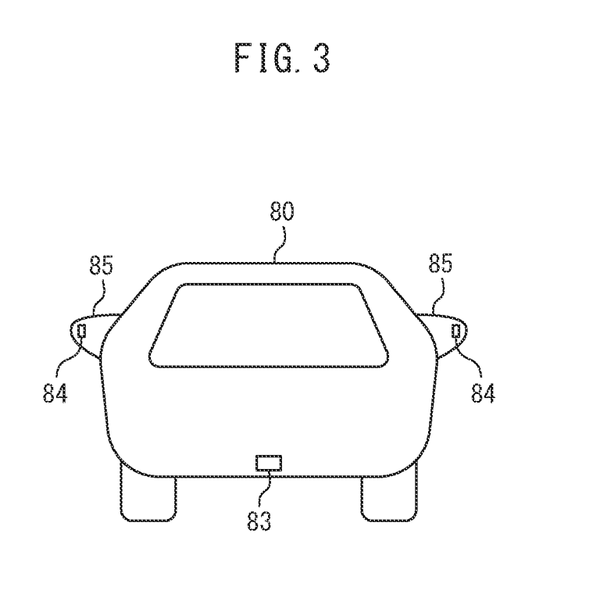
FIG. 3 is a view schematically showing a back part of the vehicle mounting the driver monitoring system.

FIG. 3 is a view schematically showing a back part of the vehicle 80 mounting the driver monitoring system 1. As shown in FIG. 3, at the vehicle 80, an object detection device 83 and indicators 84 are provided.

The object detection device 83 detects objects in the surroundings of the vehicle 80. The object detection device 83 is, for example, a radar sensor. The radar sensor emits radio waves (for example, milliwaves) to the surroundings of the vehicle 80 and receives the reflected waves of the radio waves. By doing this, the radar sensor detects the presence of any object in the surroundings of the vehicle 80 and the distance from the vehicle 80 to the object. In the present embodiment, the object detection device 83 is provided at the rear part of the vehicle (for example, the rear bumper) and detects any surrounding vehicle present in the rear lateral area of the vehicle 80.

The indicators 84 are for example LEDs. In the present embodiment, they are housed in the left and right door mirrors 85 so as to be visible to the driver. The indicators 84 are indicator lights and turn on in accordance with the output of the object detection device 83. Specifically, an indicator 84 turns on when a surrounding vehicle is detected by the object detection device 83. When a surrounding vehicle running in a lane at the right side of the vehicle 80 is detected, the right side indicator 84 is turned on, while when a surrounding vehicle running in a lane at the left side of the vehicle 80 is detected, the left side indicator 84 is turned on.

That is, the indicators 84 function as so-called "blind spot monitors" and show the presence of any surrounding vehicle at the rear lateral area of the vehicle 80. By doing this, the driver can easily recognize a surrounding vehicle present in the rear lateral area of the vehicle 80, in particular a surrounding vehicle present in a dead angle of a door mirror 85. The outputs of the indicators 84, that is, the lighting states of the indicators 84, are sent to the ECU 20 through the internal vehicle network.

Figure 4:
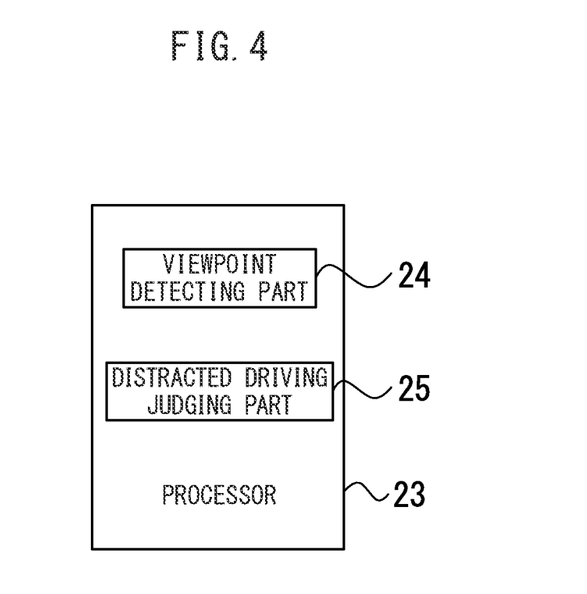
FIG. 4 is a functional block diagram of a processor of an ECU.

FIG. 4 is a functional block diagram of the processor 23 of the ECU 20. In the present embodiment, the processor 23 has a viewpoint detecting part 24 and a distracted driving judging part 25. The viewpoint detecting part 24 and the distracted driving judging part 25 are functional blocks realized by programs stored in the memory 22 of the ECU 20 being run by the processor 23 of the ECU 20.

The viewpoint detecting part 24 detects an angle of a facial orientation or a line of sight of the driver based on the facial image of the driver generated by the image capturing device 10. The distracted driving judging part 25 judges distracted driving by the driver based on the angle of the facial orientation or the line of sight detected by the viewpoint detecting part 24.

The viewpoint detecting part 24, for example, matches the facial image of the driver generated by the image capturing device 10 with facial shape data when the driver is facing forward so as to detect the angle of the facial orientation of the driver. Specifically, the viewpoint detecting part 24 makes the facial image of the driver rotate so that the rate of match of the two becomes maximum and detects the rotational angle when the rate of match becomes maximum as the angle of the facial orientation of the driver. The facial shape data is stored in advance in the memory 22 of the ECU 20 or another storage device. The facial shape data may be data of a general person or may be acquired for each driver.

Note that, the viewpoint detecting part 24 may match the facial image of the driver generated by the image capturing device 10 with a plurality of facial shape data of the driver differing in facial orientation so as to detect the angle of the facial orientation of the driver. In this case, the viewpoint detecting part 24 detects the facial orientation of the facial shape data giving the greatest rate of match of the two as the angle of the facial orientation of the driver. The plurality of facial shape data is stored in advance in the memory 22 of the ECU 20 or another storage device. The plurality of facial shape data may be data of the faces of general persons or may be acquired for each driver.

Further, the viewpoint detecting part 24, for example, detects the angle of the line of sight of the driver by the following method. First, the viewpoint detecting part 24 identifies the facial region from the facial image of the driver generated by the image capturing device 10 and extracts the features of the eyes, nose, mouth, and other facial parts so as to detect the facial parts. Next, the viewpoint detecting part 24 detects the position of the Purkinje image (corneal reflex image) and the position of the center of the pupil and detects the angle of the line of sight of the driver based on the positional relationship of the Purkinje image and the center of the pupil. Note that, the viewpoint detecting part 24 may detect the angle of the line of sight of the driver based on the positional relationship of the Purkinje image and the center of the pupil and the detected angle of the facial orientation of the driver.

Further, the viewpoint detecting part 24 may detect the angle of the facial orientation or the line of sight of the driver by other known techniques.

As explained above, in the vehicle 80, the indicator 84 is turned on when a surrounding vehicle is detected by the object detection device 83. At this time, the driver looks at the indicator 84 so as to check the indication of the indicator 84. That is, the driver makes his facial orientation and line of sight move from the front toward the indicator 84. If at this time it is judged that the driver is driving while distracted and the driver is given a warning, it would mean a warning is given to an appropriate action of the driver and the driver would be irritated.

For this reason, in the present embodiment, when the indicator 84 is turned on, the distracted driving judging part 25 eases the condition for judging distracted driving concerning a predetermined angular range when the driver looks at the indicator 84. By doing this, it is possible to keep the driver's action of viewing the indicator 84 from being determined as distracted driving and in turn it is possible to suitably detect distracted driving of the driver.

In the present embodiment, the distracted driving judging part 25 judges that the driver is driving while distracted when the angle of the facial orientation or the line of sight of the driver is outside a threshold range for equal to or greater than a threshold time and, when the indicator 84 is turned on, broadens the threshold range so that a predetermined angular range is included in the threshold range. The predetermined angular range is determined in advance based on the position of the indicator 84.

<Processing for Setting Threshold Range>

Figure 5:
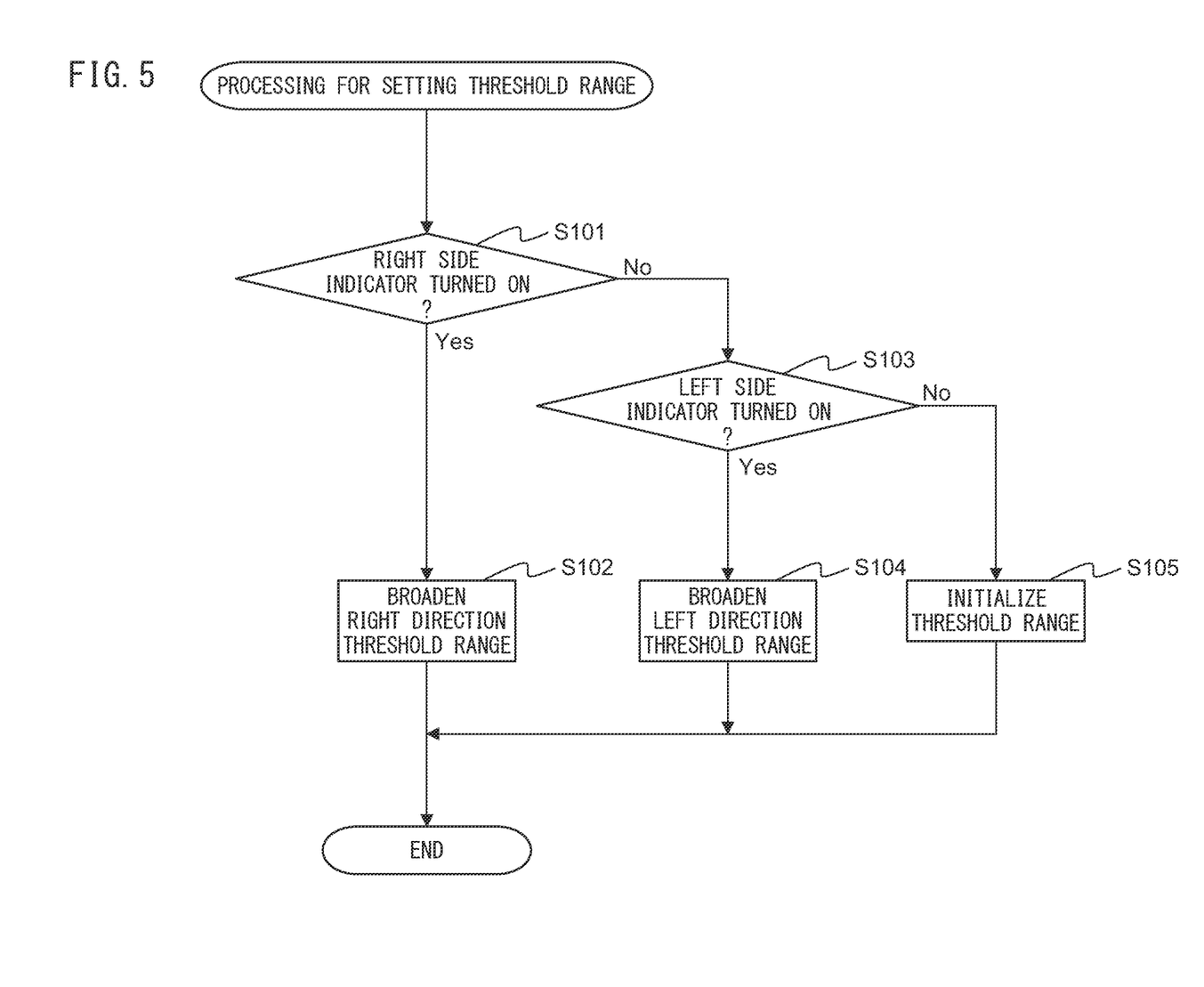
FIG. 5 is a flow chart showing a control routine of processing for setting a threshold range in the first embodiment.

Below, referring to the flow charts of FIG. 5 and FIG. 6, the control for detecting distracted driving of a driver using the driver monitoring system 1 will be explained in detail. FIG. 5 is a flow chart showing a control routine of processing for setting a threshold range in the first embodiment. The present control routine is repeatedly performed by the ECU 20 at predetermined time intervals. In the present control routine, the threshold range used for judgment of distracted driving is set.

First, at step S101, the distracted driving judging part 25 judges whether the right side indicator 84 has turned on. If it is judged that the right side indicator 84 has turned on, the present control routine proceeds to step S102.

At step S102, the distracted driving judging part 25 broadens the right direction threshold range so that the predetermined angular range when the driver looks at the right side indicator 84 becomes included in the threshold range. For example, the distracted driving judging part 25 changes the upper limits of the left and right direction threshold range from +15° to +45°. After step S102, the present control routine ends.

On the other hand, if it at step S101 it is judged that the right side indicator 84 is not turned on, the present control routine proceeds to step S103. At step S103, the distracted driving judging part 25 judges whether the left side indicator 84 is turned on. If it is judged that the left side indicator 84 is turned on, the present control routine proceeds to step S104.

At step S104, the distracted driving judging part 25 broadens the left direction threshold range so that the predetermined angular range when the driver looks at the left side indicator 84 becomes included in the threshold range. For example, the distracted driving judging part 25 changes the lower limit of the left and right direction threshold range from −15° to −45°. After step S104, the present control routine ends.

On the other hand, if it at step S103 it is judged that the left side indicator 84 is not turned on, the present control routine proceeds to step S105. At step S105, the distracted driving judging part 25 initializes the threshold range. That is, the threshold range is returned to the initial value before the change. The initial value of the threshold range is determined in advance and, for example, is set to a predetermined range centered at 0° (front) (for example, left and right directions ±15°). After step S105, the present control routine ends.

Note that, the threshold range may be initialized after several seconds from the indicator being turned off. That is, the threshold may be maintained at the changed value until several seconds from the indicator 84 being turned off.

<Processing for Judging Distracted Driving>

Figure 6:
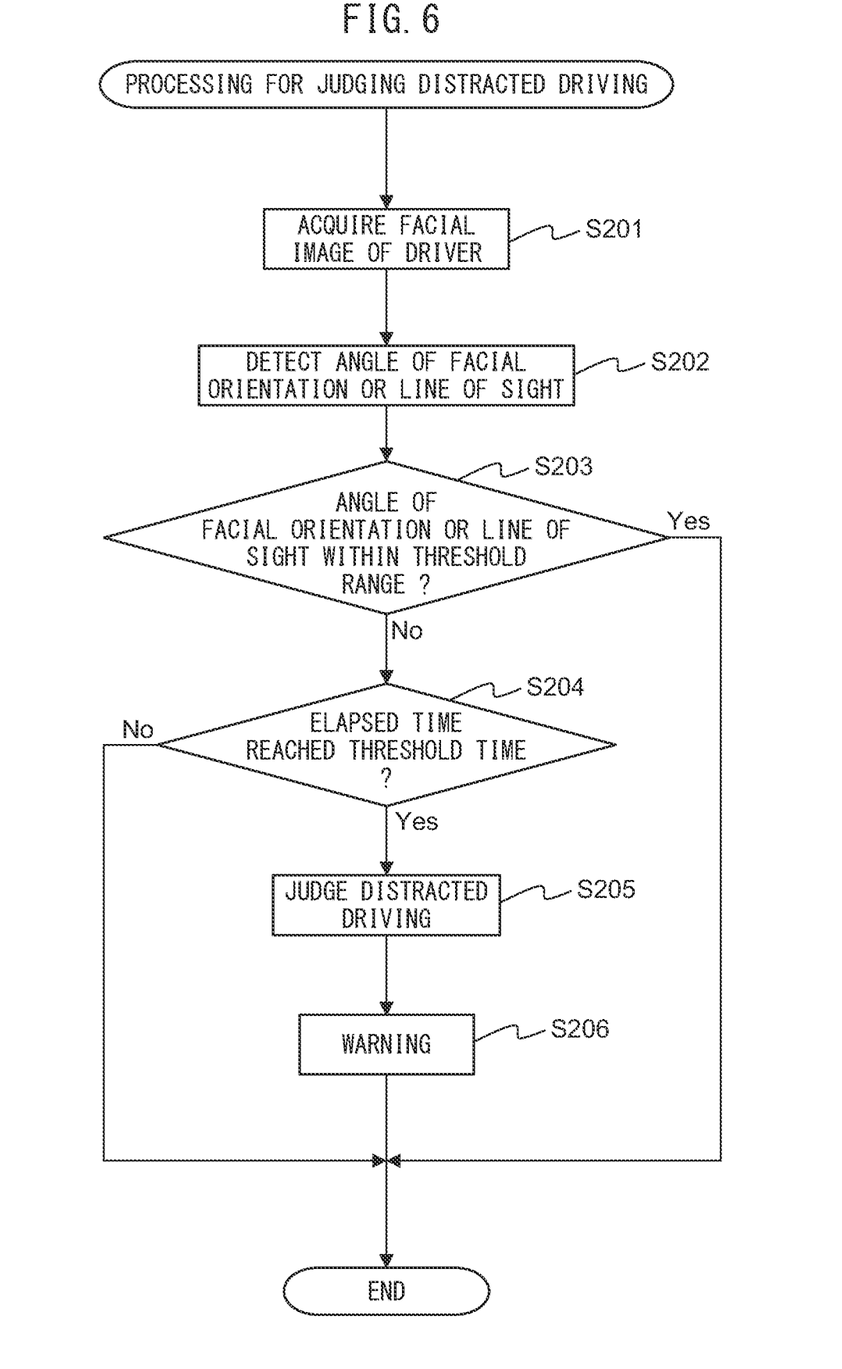
FIG. 6 is a flow chart showing a control routine of processing for judging distracted driving in the first embodiment.

FIG. 6 is a flow chart showing a control routine of processing for judging distracted driving in the first embodiment. The present control routine is repeatedly performed by the ECU 20. In the present control routine, it is judged whether the driver is driving while distracted.

First, at step S201, the viewpoint detecting part 24 acquires the facial image of the driver generated by the image capturing device 10.

Next, at step S202, the distracted driving judging part 25 detects the angle of the facial orientation or the line of sight of the driver based on the facial image of the driver by any of the above methods.

Next, at step S203, the distracted driving judging part 25 judges whether the angle of the facial orientation or the line of sight of the driver is within a threshold range. As the threshold range, the value set by the control routine of FIG. 5 is used. If it is judged that the angle of the facial orientation or the line of sight of the driver is within the threshold range, the present control routine ends.

On the other hand, if at step S203 it is judged that the angle of the facial orientation or the line of sight of the driver is outside of the threshold range, the present control routine proceeds to step S204. At step S204, the distracted driving judging part 25 judges whether the elapsed time has reached a threshold time. That is, the distracted driving judging part 25 judges whether the angle of the facial orientation or the line of sight of the driver has been maintained outside of the threshold range for the threshold time. The threshold time is determined in advance. If it is judged that the elapsed time has not reached the threshold time, the present control routine ends.

On the other hand, if at step S204 it is judged that the elapsed time has reached the threshold time, the present control routine proceeds to step S205. At step S205, the distracted driving judging part 25 judges that the driver is driving while distracted.

Next, at step S206, the distracted driving judging part 25 issues a warning to the driver. For example, the distracted driving judging part 25 visually or audibly issues a warning to the driver through a human machine interface (HMI) provided at the inside of the vehicle 80. After step S206, the present control routine ends.

<Second Embodiment>

The configuration and control of the driver monitoring system according to a second embodiment are basically similar to the configuration and control of the driver monitoring system according to the first embodiment except for the points explained below. For this reason, below, the second embodiment of the present disclosure will be explained centered on parts different from the first embodiment.

The action of the driver looking at an indicator 84 when the indicator 84 is turned on is an appropriate action, but it is not preferable safety wise that the driver continue looking only at the indicator 84. Therefore, in the second embodiment, the condition for judging distracted driving concerning the predetermined angular range when the driver looks at the indicator 84 is eased in the following way.

When the indicator 84 is not turned on, the distracted driving judging part 25 judges that the driver is driving while distracted if the angle of the facial orientation or the line of sight of the driver has been maintained within the predetermined angular range for equal to or greater than a first threshold time, while when the indicator 84 is turned on, it judges that the driver is driving while distracted if the angle has been maintained within the predetermined angular range for equal to or greater than a second threshold time. The second threshold time is longer than the first threshold time. When the indicator 84 is turned on, the time is lengthened until distracted driving is judged. By doing this, it is possible to more suitably detect distracted driving of the driver.

<Processing for Judging Distracted Driving>

Figure 7:
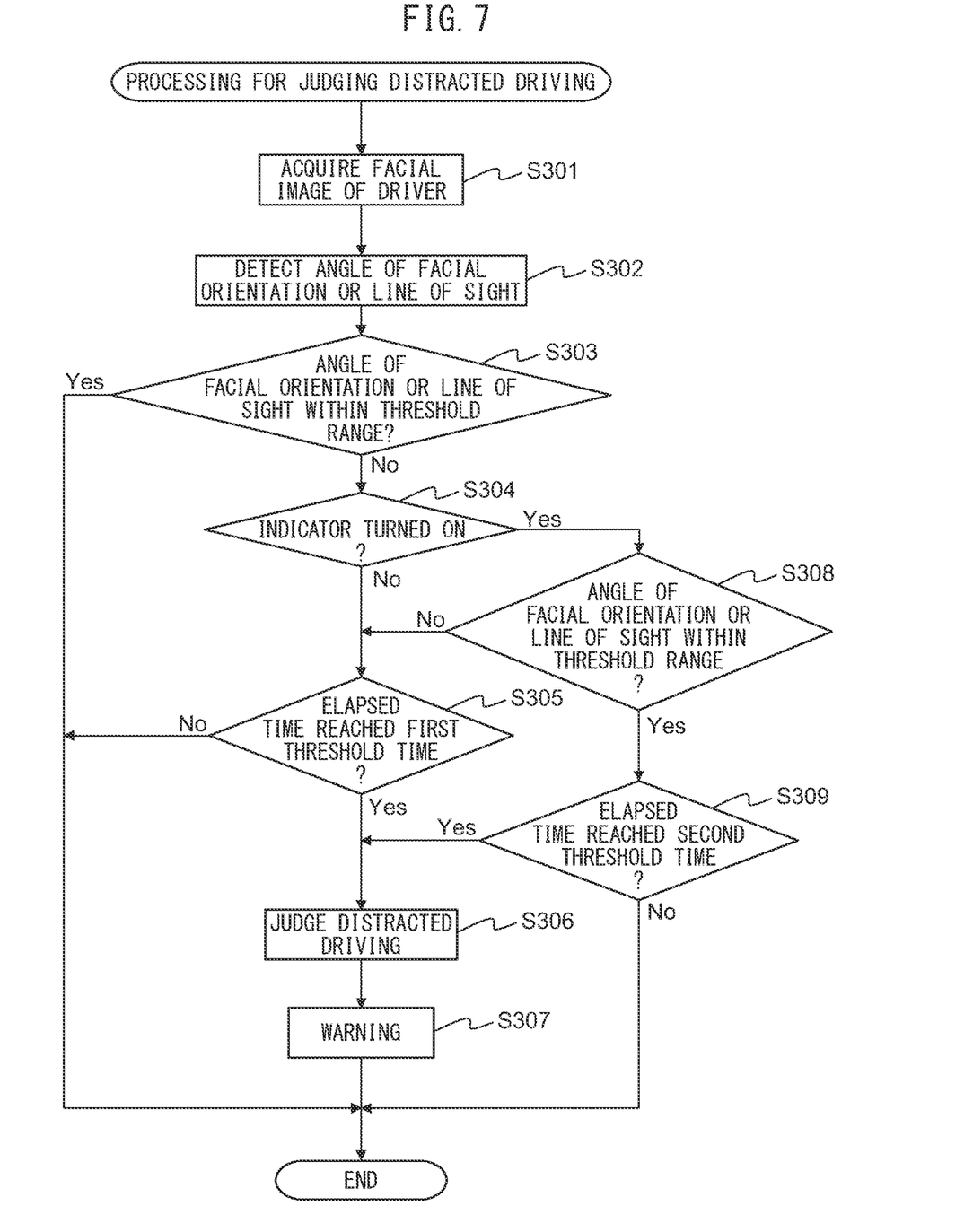
FIG. 7 is a flow chart showing a control routine of processing for judging distracted driving in a second embodiment.

FIG. 7 is a flow chart showing a control routine of processing for judging distracted driving in the second embodiment. The present control routine is repeatedly performed by the ECU 20. In the present control routine, it is judged whether the driver is driving while distracted.

First, at step S301, the viewpoint detecting part 24 acquires the facial image of the driver generated by the image capturing device 10.

Next, at step S302, the distracted driving judging part 25 detects the angle of the facial orientation or the line of sight of the driver based on the facial image of the driver by any of the above methods.

Next, at step S303, the distracted driving judging part 25 judges whether the angle of the facial orientation or the line of sight of the driver is within a threshold range. The threshold range is determined in advance and, for example, is set to a predetermined range centered at 0° (front) (for example, left and right directions ±15°). If it is judged that the angle of the facial orientation or the line of sight of the driver is within the threshold range, the present control routine ends.

On the other hand, if at step S303 it is judged that the angle of the facial orientation or the line of sight of the driver is outside the threshold range, the present control routine proceeds to step S304. At step S304, the distracted driving judging part 25 judges whether an indicator 84 is turned on. If it is judged that the indicator is turned on, the present control routine proceeds to step S308.

At step S308, the distracted driving judging part 25 judges whether the angle of the facial orientation or the line of sight of the driver is within a predetermined angular range. The predetermined angular range is the angular range when the driver looks at the indicator 84 and is determined in advance based on the position of the indicator 84. Note that the predetermined angular range is an angle outside of the threshold range. If the right side indicator 84 is turned on, a predetermined angle for the right side indicator 84 is used, while if the left side indicator 84 is turned on, a predetermined angle for the left side indicator 84 is used.

If at step S304 it is judged that the indicator 84 is not turned on or if at step S308 it is judged that the angle of the facial orientation or the line of sight of the driver is outside the predetermined angular range, the present control routine proceeds to step S305. At step S305, the distracted driving judging part 25 judges whether the elapsed time has reached a first threshold time. That is, the distracted driving judging part 25 judges whether the angle of the facial orientation or the line of sight of the driver has been maintained outside the threshold range for a first threshold time. The first threshold time is determined in advance. If it is judged that the elapsed time has not reached the first threshold time, the present control routine ends.

On the other hand, if at step S305 it is judged that the elapsed time has reached the first threshold time, the present control routine proceeds to step S306. At step S306, the distracted driving judging part 25 judges that the driver is driving while distracted.

Next, at step S307, the distracted driving judging part 25 issues a warning to the driver. For example, the distracted driving judging part 25 issues a warning to the driver visually or audibly through an HMI provided at the inside of the vehicle 80. After step S307, the present control routine ends.

Further, if at step S308 it is judged that the angle of the facial orientation or the line of sight of the driver is within the predetermined angular range, the present control routine proceeds to step S309. At step S309, the distracted driving judging part judges whether the elapsed time has reached the second threshold time. That is, the distracted driving judging part 25 judges whether the angle of the facial orientation or the line of sight of the driver has been maintained within the predetermined angular range for a second threshold time. The second threshold time is determined in advance and is set to a time longer than the first threshold time.

Even if at step S309 the indicator 84 is turned off and again turned on, so long as the angle of the facial orientation or the line of sight of the driver is maintained within the predetermined angular range, the elapsed time continues to be counted. Note that, the elapsed time may be reset to zero when the indicator 84 is turned on again.

If at step S309 it is judged that the elapsed time has not reached the second threshold time, the present control routine ends. On the other hand, if at step S309 it is judged that the elapsed time has reached the second threshold time, the present control routine proceeds to step S306. The distracted driving judging part 25 judges at step S306 that the driver is driving while distracted and issues a warning to the driver at step S307. After step S307, the present control routine ends.

Above, preferred embodiments according to the present disclosure were explained, but the present disclosure is not limited to these embodiments. Various corrections and changes can be made within the language of the claims. For example, the indicators 84 may be provided at the inside of the vehicle 80 (left and right A pillars, a room mirror, a navigation system, etc.).

REFERENCE SIGNS LIST 1 driver monitoring system
10 image capturing device
20 electronic control unit (ECU)
23 processor
24 viewpoint detecting part
25 distracted driving judging part 80 vehicle
84 indicator

The invention claimed is:

1. A driver monitoring system comprising:
an image capturing device capturing a face of a driver of a vehicle to generate a facial image of the driver; and
a processor configured to detect an angle of a facial orientation or a line of sight of the driver based on the facial image, and judge distracted driving by the driver based on the angle, wherein
the vehicle is provided with an indicator showing a presence of a surrounding vehicle in a rear lateral area of the vehicle, and
when the indicator is turned on, the processor is configured to ease a condition for judging distracted driving concerning a predetermined angular range when the driver looks at the indicator,
wherein the indicator is visible within the predetermined angular range,
wherein the processor is further configured to:
determine whether the indicator is turned on;
based on a determination that the indicator is not turned on, judge that the driver is driving while distracted when the driver looks at the indicator for greater than or equal to a first threshold time; and
based on another determination that the indicator is turned on, judge that the driver is driving while distracted when the driver looks at the indicator for greater than or equal to a second threshold time, and the second threshold time is longer than the first threshold time.

2. The driver monitoring system of claim 1, wherein the processor is further configured to:
when the indicator is turned off after being turned on, maintain the second threshold time for a time period.

3. The driver monitoring system of claim 1, wherein the processor is further configured to:
continue to count an elapsed time of the driver looking at the indicator when the angle is maintained within the predetermined angular range and the indicator is turned off and turned on.

* * * * *